United States Patent
Cili et al.

(10) Patent No.: US 10,154,131 B2
(45) Date of Patent: Dec. 11, 2018

(54) EXECUTING INSTRUCTIONS IN RESPONSE TO A COMMUNICATION

(71) Applicant: Apple Inc., Cupertino, CA (US)

(72) Inventors: Gencer Cili, Santa Clara, CA (US); Devrim Varoglu, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 457 days.

(21) Appl. No.: 13/770,429

(22) Filed: Feb. 19, 2013

(65) Prior Publication Data

US 2014/0232815 A1    Aug. 21, 2014

(51) Int. Cl.
| | |
|---|---|
| *H04M 1/725* | (2006.01) |
| *H04M 1/2745* | (2006.01) |
| *H04N 7/14* | (2006.01) |
| *A61B 5/00* | (2006.01) |
| *G06Q 10/10* | (2012.01) |
| *H04L 29/06* | (2006.01) |
| *H04L 12/18* | (2006.01) |

(52) U.S. Cl.
CPC ...... *H04M 1/72597* (2013.01); *H04M 1/2745* (2013.01)

(58) Field of Classification Search
CPC ............ H04M 1/72597; H04M 1/2745; H04N 7/147; A61B 5/411; G06Q 10/107; G06Q 10/109; H04L 63/20; H04L 12/1818
USPC .......... 715/763, 863; 348/14.08; 379/218.01; 600/509; 455/412.1; 705/14.66
See application file for complete search history.

(56) References Cited

U.S. PATENT DOCUMENTS

| | | | |
|---|---|---|---|
| 8,848,892 B2* | 9/2014 | Ratnakar .................. | 379/201.01 |
| 2005/0148890 A1* | 7/2005 | Hastings .............. | A61B 5/0006 |
| | | | 600/509 |
| 2008/0201650 A1* | 8/2008 | Lemay .............. | G06F 17/30884 |
| | | | 715/763 |
| 2008/0205621 A1* | 8/2008 | Ratnakar .............. | G06Q 10/107 |
| | | | 379/218.01 |
| 2009/0111447 A1* | 4/2009 | Nurmi .................. | G06Q 10/107 |
| | | | 455/418 |
| 2011/0088002 A1* | 4/2011 | Freer ...................... | G06F 3/017 |
| | | | 715/863 |
| 2011/0092187 A1* | 4/2011 | Miller ........................ | 455/412.1 |
| 2011/0246308 A1* | 10/2011 | Segall .................. | G06Q 10/109 |
| | | | 705/14.66 |
| 2014/0046943 A1* | 2/2014 | Scott ................ | G06F 17/30598 |
| | | | 707/737 |

FOREIGN PATENT DOCUMENTS

| | | | |
|---|---|---|---|
| WO | WO 2009/056947 A2 * | 5/2009 | |
| WO | WO 2009056947 A2 * | 5/2009 | |

\* cited by examiner

*Primary Examiner* — Yogeshkumar Patel
(74) *Attorney, Agent, or Firm* — Blank Rome LLP

(57) ABSTRACT

An instruction execution engine on a user device may be configured to receive an executable instruction assigned to one or more contacts or groups of contacts. A communication from the one or more contacts or groups may be detected. Upon detecting the communication, the engine may execute the executable instruction. This executing step may trigger a user reminder or data transfer to one or more third parties.

18 Claims, 12 Drawing Sheets

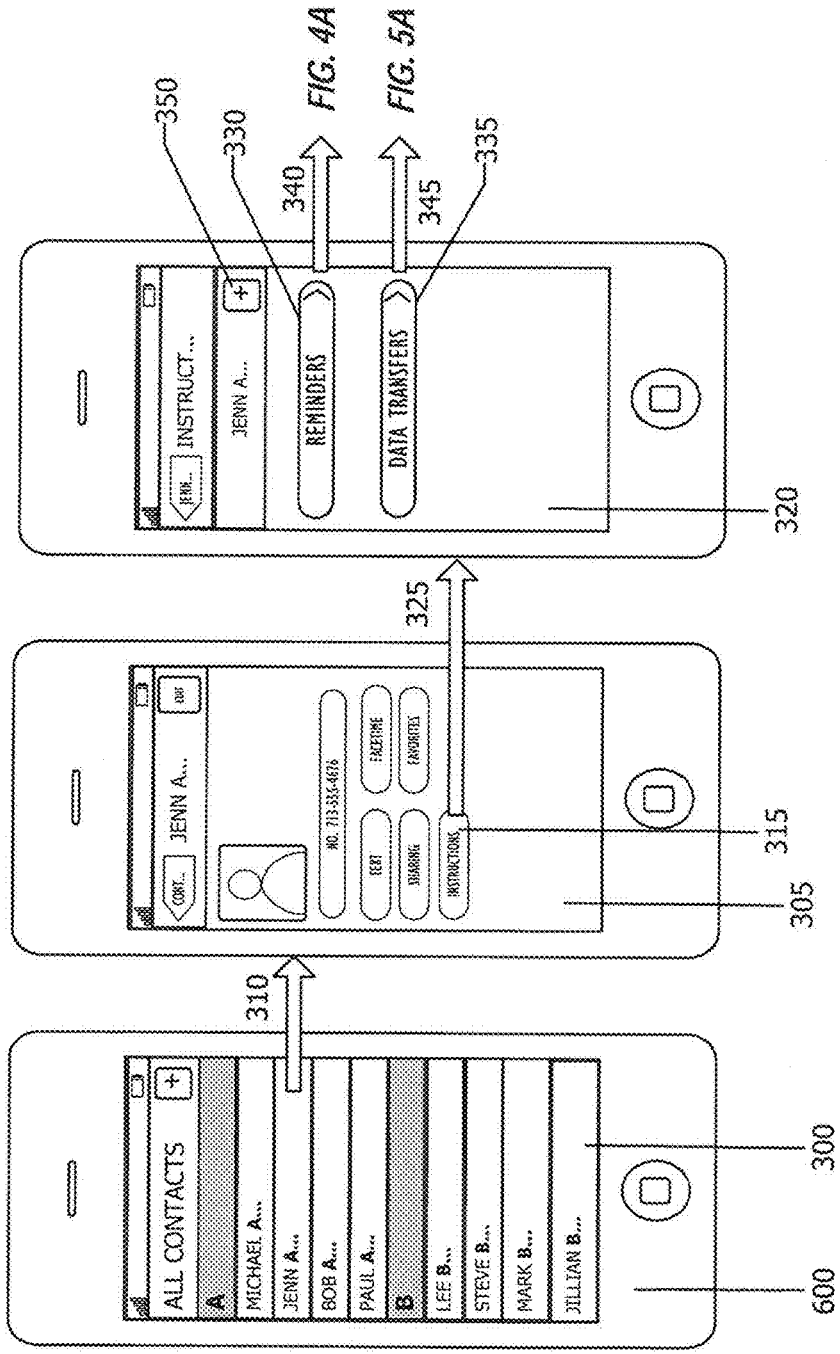

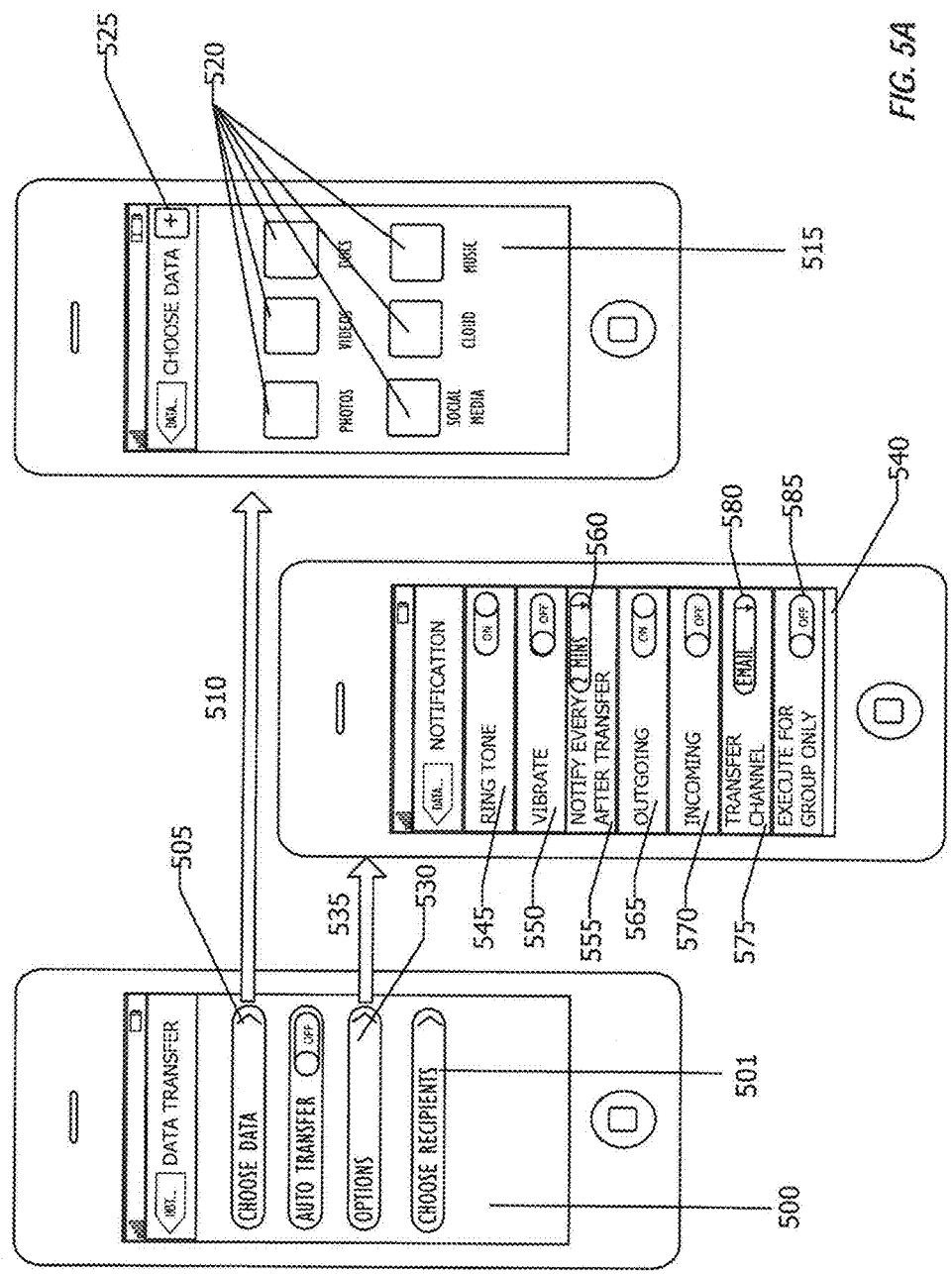

EXECUTING INSTRUCTIONS IN RESPONSE TO A COMMUNICATION

BACKGROUND

The present application relates generally to executing instructions in response to a communication. More particularly, the present application relates to displaying user reminders or executing data transfers on an electronic device when the device communicates with a specific contact or group of contacts.

Millions of people rely on electronic devices to manage their daily lives. These devices include computers, mobile phones, personal music players, tablet computers, or other similar electronic devices. Often, these devices are relied upon to notify their users of upcoming events (e.g., a doctor's appointment, a meeting, a flight, etc.). A notification may be provided to the user in response to a user-configured trigger, such as a specific time or location. For example, the user can configure their device to trigger an event notification one hour before the event starts. Alternatively, the user can configure their device to trigger the notification when the device is within a certain distance of the event's physical location.

Thus, existing devices can be configured to trigger notifications at a user-specified time or near a user-specified location. But they cannot be configured to trigger notifications in response to a communication between the device's user and one or more third parties. For example, a user may wish to receive a reminder after establishing communication with a certain contact or group of contacts. Alternatively, the user may wish to execute a data transfer in response to communicating with the contact(s). Thus, there is need in the art for systems and methods that can execute a user-configured instruction in response to a communication from or to a device.

SUMMARY

A summary of certain embodiments disclosed herein is set forth below. It's understood that this section is presented merely to provide the reader with a brief summary of certain embodiments and that these descriptions are not intended to limit this application's scope. Indeed, this disclosure may encompass a variety of embodiments that may not be set forth herein.

In one embodiment, a method executes one or more user-defined instructions in response to a communication between the user and one or more of the user's contacts or groups of contacts. The method may receive from the user, on a device, one or more instructions assigned to one or more contacts or groups of contacts. When the user communicates with the one or more contacts or groups the method executes the instruction. The method may be embodied in program code and stored on a non-transitory medium. The stored program code may be executed by one or more processors that are part of or controls the device.

In another embodiment, executing the one or more instructions may cause the device to display to the user a user-defined reminder. In yet another embodiment, executing the one or more instructions may cause the device to transfer data to one or more third parties.

BRIEF DESCRIPTION OF THE DRAWINGS

The foregoing summary, as well as the following detailed description, will be better understood when read in conjunction with the appended drawings. For the purpose of illustration only, there is shown in the drawings certain embodiments. It's understood, however, that the invention is not limited to the precise arrangements and instrumentalities shown in the figures.

FIG. 3 shows a plurality of screens that may be displayed to access an instruction's interface and create instructions, in accordance with an embodiment.

FIGS. 5A-5D show a plurality of screens that may be displayed to create and confirm a data transfer, in accordance with an embodiment.

DETAILED DESCRIPTION

Figure 1:
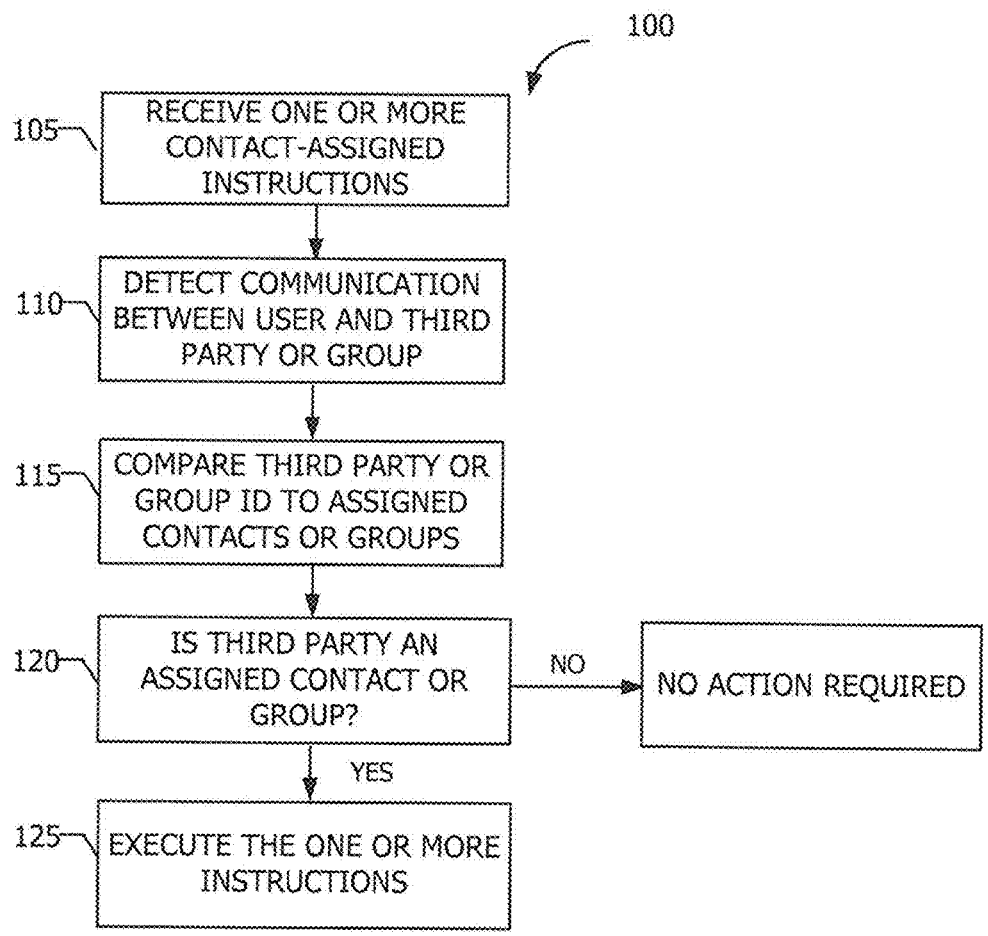
FIG. 1 is a flow chart showing a method for executing instructions in response to a communication between a user and a third party, in accordance with an embodiment.

This disclosure is generally directed to systems, methods, and computer readable media for executing user-defined instructions in response to a communication. In general, the application discloses techniques to receive executable instructions on an electronic device that may then be assigned to one or more specific contacts or groups of contacts. The instructions execute when the device communicates with the one or more specified contacts or groups. In one embodiment, executing the instructions may cause the device to display a user reminder. In another embodiment, executing the instructions may cause the device to transfer data to a third party.

Before explaining at least one embodiment in detail, it's understood that the invention set forth herein is not limited in its application to the construction details or component arrangements set forth in the following description or illustrated in the drawings. The invention is capable of other embodiments and being practiced and carried out in various ways. Also, it's understood that the phraseology and terminology employed herein are merely for descriptive purposes and are not considered limiting.

It's also understood that any one of the described features may be used separately or in combination with other features. Other invented systems, methods, features, and advantages will be or become apparent to one with skill in the art upon examining the drawings and the detailed description herein. It's intended that all such additional systems, methods, features, and advantages be protected by the accompanying claims.

Referring to FIG. 1, a method for executing instructions 100 is carried out in a device. In one embodiment, the method can be carried out in an instruction execution engine, which may function as a stand-alone application or may be integrated with the device's operating system. Furthermore, the device can be any type, including but not limited to workstation and desk-top computer systems, mobile phones, personal music players, tablet computer systems, or other similar electronic devices.

The device receives one or more contact-assigned instructions 105 from a user. In one embodiment, an instruction may be a user-defined action set to execute when the user communicates with one or more contacts or groups of contacts, or vice versa. As will be discussed in greater detail below, a user may directly input the instructions into the device. For example, the user may input the instructions through a stand-alone application, or through any communication channel, including but not limited to telephone, text messaging, email, instant messaging, social networking applications, etc. Also, the user may input the instructions via any mode of input, including but not limited to voice command, text input, menu selection, etc.

In an embodiment, the one or more instructions comprise any user-definable action disclosed herein, including but not limited to reminders or data transfers. For example, in one embodiment, the user can create a reminder instruction that, when executed, triggers a reminder to discuss a certain topic, ask a particular question, make an affirmative statement, perform a task, attend an event, etc. It's understood that the reminder can comprise any notification type desired by the user, including but not limited to any notification relevant to a communication between the user and any third party. In yet another embodiment, the user can create a data transfer instruction that, when executed, triggers a data transfer to one or more contacts. It's understood that the data can comprise any transferable data, including but not limited to images, videos, contacts, documents, music files, etc. It's also understood that the data can come from any source, including but not limited to a photo gallery, video gallery, music player, documents file, social networking media, cloud, etc. A photo gallery and video gallery may include any system that can store any types of digital photographs and videos, respectively. A music player can be any music player that can store and play any type of digital music file. A documents file may include any system that can store any type of document. Social networking media may include any system where users can interact and create, share, or exchange information. A cloud may include any type of online storage system.

In another embodiment, transferable data can be stored in a source outside the device (e.g., cloud). If data is stored outside of the device, the device can download the data from the outside source either when the instruction is created or when the instruction is executed. The device can then transfer the downloaded data when the data transfer instruction is executed. Alternatively, when a data transfer instruction is executed, the device can cause the outside source to transfer the data from the outside source to the one or more contacts.

Furthermore, the user may assign the one or more instructions to one or more of its contacts or groups of contacts so that the instruction only executes when the user communicates with those one or more contacts or those one or more groups. For example, a user can assign a reminder instruction to a certain contact. When the user sends a communication to that contact or receives a communication from that contact, the device executes the instruction to trigger the reminder. Alternatively, the user can assign the reminder instruction to a group communication (e.g., co-workers). When the user sends the communication to that entire group, the device can execute the instruction to trigger the reminder. But the reminder may not be triggered if the communication is only sent to a single member of the group. In yet another embodiment, the user can assign the reminder instruction to one or more contacts, or one or more members of a group. When the user sends the communication to any of the one or more contacts or group members, or receives a communication from any of the one or more contacts or group members, the device can execute the instruction to trigger the reminder.

A person of ordinary skill in the art understands that there are numerous ways that a user can create an instruction and assign it to one or more contacts within the spirit and scope of this application. In one embodiment, a user can create and assign an instruction through many communication channels, including but not limited to telephone, text messaging, email, instant messaging, social networking application, etc. For example, the user can create an instruction and assign it to a contact through the user's text messaging contacts interface. Alternatively, the user can create and assign instructions in a stand-alone application that has access to all of the user's contacts. Furthermore, in an alternative embodiment, the user can create instructions through a voice recognition system (e.g., Siri®) (SIRI is a registered trademark of Apple Inc.).

After receiving the one or more contact- or group-assigned instructions, the device can detect communications between the user and a third party or group of third parties 110. For example, in one embodiment, the device may detect an incoming communication sent by a third party to the user. In another embodiment, the device may detect an outgoing communication sent by the user to a third party or group. The device can detect incoming and outgoing communications from all of the device's communication channels, including but not limited to telephone, text messaging, email, instant messaging, or any social networking.

When the device detects a communication between the user and a third party or group 110 it compares the third party's or group's identification to the one or more contacts or groups of contacts assigned to instructions 115, if any. In one embodiment, for group communications, the individual group member identifications may be compared. In an alternative embodiment, the group identity may be compared (e.g., parents, favorites, etc.). The device can then determine whether or not the third party is an assigned contact or group 120. For example, if the third party's or group's identification does not match any of the contacts or groups assigned to instructions, then the device takes no further action. However, if the third party's or group's identification matches one of the contacts or groups assigned to the instructions, then the device may then execute the instruction 125.

In one embodiment, executing the one or more instructions 125 may cause the device to display a user-defined reminder. By way of example only, a communication with a contact or group may trigger display of a reminder to discuss a certain topic with the contact or group. In addition, in yet another embodiment, the device may generate a notification (e.g., an audible tone) to alert the user to the displayed reminder. After displaying the reminder, the device may repeat the notification according to a predefined frequency (e.g., every two minutes or until a specified time-limit is reached) until the user clears the reminder from the display, or from the device's notifications history.

In an alternative embodiment, executing the one or more instructions 125 may cause the device to transfer data. As an example, communication with a contact or group may trigger the device to transfer data from the device to the contact, group, or any other third party. In one embodiment, when the data transfer instruction is executed 125 the device may automatically transfer the data. In another embodiment, when the data transfer instruction is executed 125 the device can prompt the user to permit or decline the transfer. Furthermore, in any embodiments disclosed herein, the device may transfer the data to a third party through any communication channels, including but not limited to telephone, text messaging, email, instant messaging, social networking, etc. In still another embodiment, the device may confirm the data transfer by displaying a confirmation prompt. As with displayed reminders, the device may generate a notification (e.g., an audible tone) to alert the user of the confirmation prompt. The device may repeat the notification according to a predefined frequency (e.g., every two minutes up to, for example, a specified time-limit) until the user clears the confirmation from the display, or from the device's notifications history.

Figure 2:
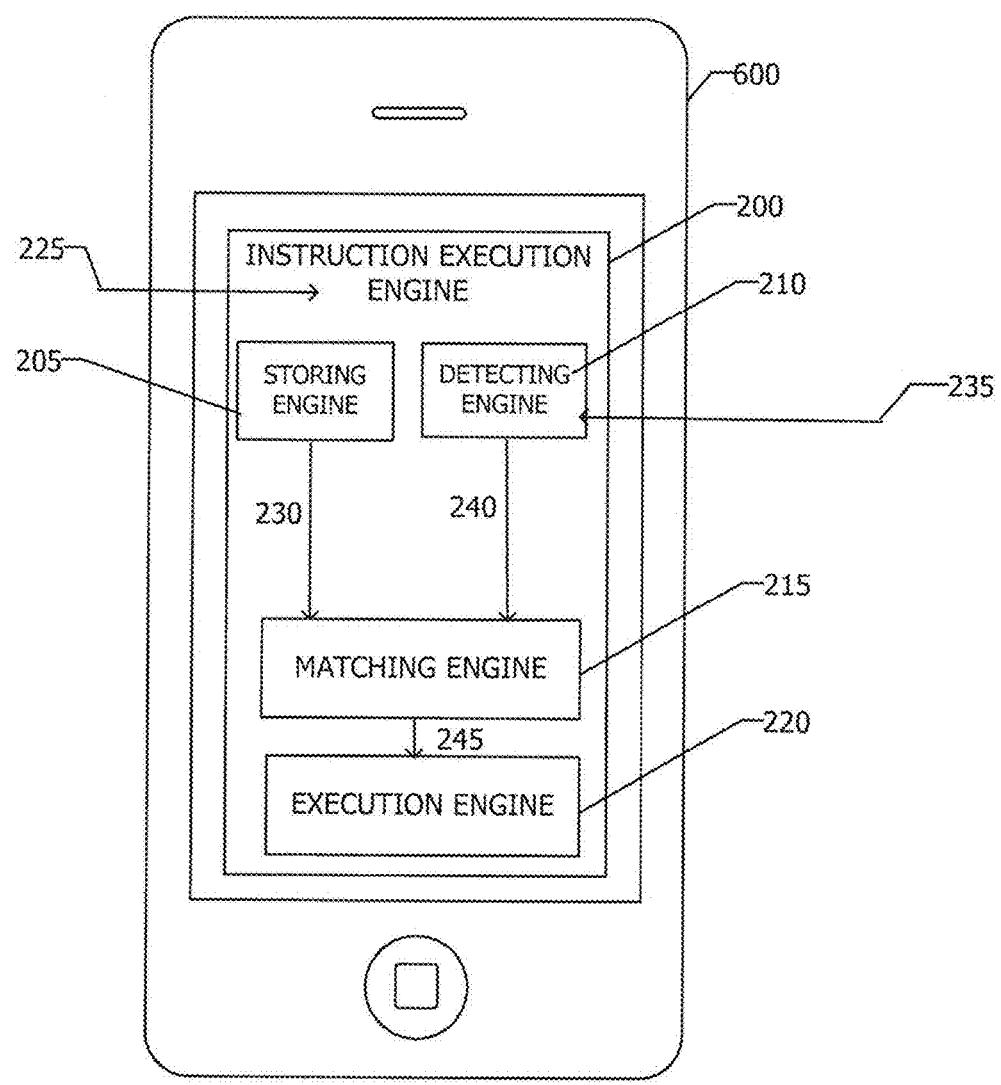
FIG. 2 shows components of an instruction execution engine, in accordance with an embodiment.

FIG. 2 illustrates one embodiment of the aforementioned instruction execution engine 200. The instruction execution engine 200 may be designed to carry out the methods described in FIG. 1, and any other methods derived therefrom or within the spirit and scope of this application.

Instruction execution engine 200 may be a stand-alone application or may integrate with a device's 600 operating system and hardware. The device 600 can be any type, including but not limited to workstation and desktop computer systems, mobile phones, personal music players, tablet computer systems, or other similar electronic devices.

The instruction execution engine 200 can receive one or more executable instructions that are input into the device 600 by the device's user (225). As already explained above for FIG. 1, the one or more instructions can comprise any user-defined instruction, including but not limited to a reminder or data transfer. Furthermore, the one or more instructions may be assigned by the user to one or more contacts or groups.

A storing engine 205 can receive and store the assigned instructions. The storing engine may communicate with a matching engine 215 (230), which may also communicate with a detecting engine 210 (240).

The detecting engine 210 can detect communication events (235). For example, it can detect incoming and outgoing communications between a user and a third party or group of third parties. In one embodiment, the detecting engine can detect communications from any communication channel, including but not limited to telephone, text messaging, instant messaging, email, social networking, etc. When the detecting engine 210 detects a communication event 235 between a user and a third party or group, it may pass to the matching engine 215 the third party's identity (240).

The matching engine 215 can compare the third party's or group's identification to the assigned instructions, which are obtained from the storing engine 205 (230). If the third party's or group's identification does not match any of the contacts or groups assigned to instructions, the instruction execution engine 200 may take no further action. However, if the third party's or group's identification matches at least one of the contacts or groups assigned to the instructions, the matching engine 215 can pass the relevant instruction(s) to the execution engine 220 (245).

In one embodiment, for group communications, the matching engine 215 compares the individual group member identifications. In an alternative embodiment, the matching engine 215 may compare the group identity (e.g., parents, favorites, etc.).

Finally, the execution engine 220 can execute any instructions the matching engine 215 passes to it. As explained in detail above for FIG. 1, executing the instruction may cause the device to display a user-defined reminder. Alternatively, executing the instruction may cause the device to transfer data from the device to any third party or group. In one embodiment, the execution engine 220 could confirm data transfer by displaying a prompt. In another embodiment, the reminder or confirmation may be audibly delivered to the user (e.g., Siri). In yet another embodiment, executing the instruction may display one or more of a selectable set of pre-defined default reminders (e.g., phone wife, send data, etc.)

Figure 4A:
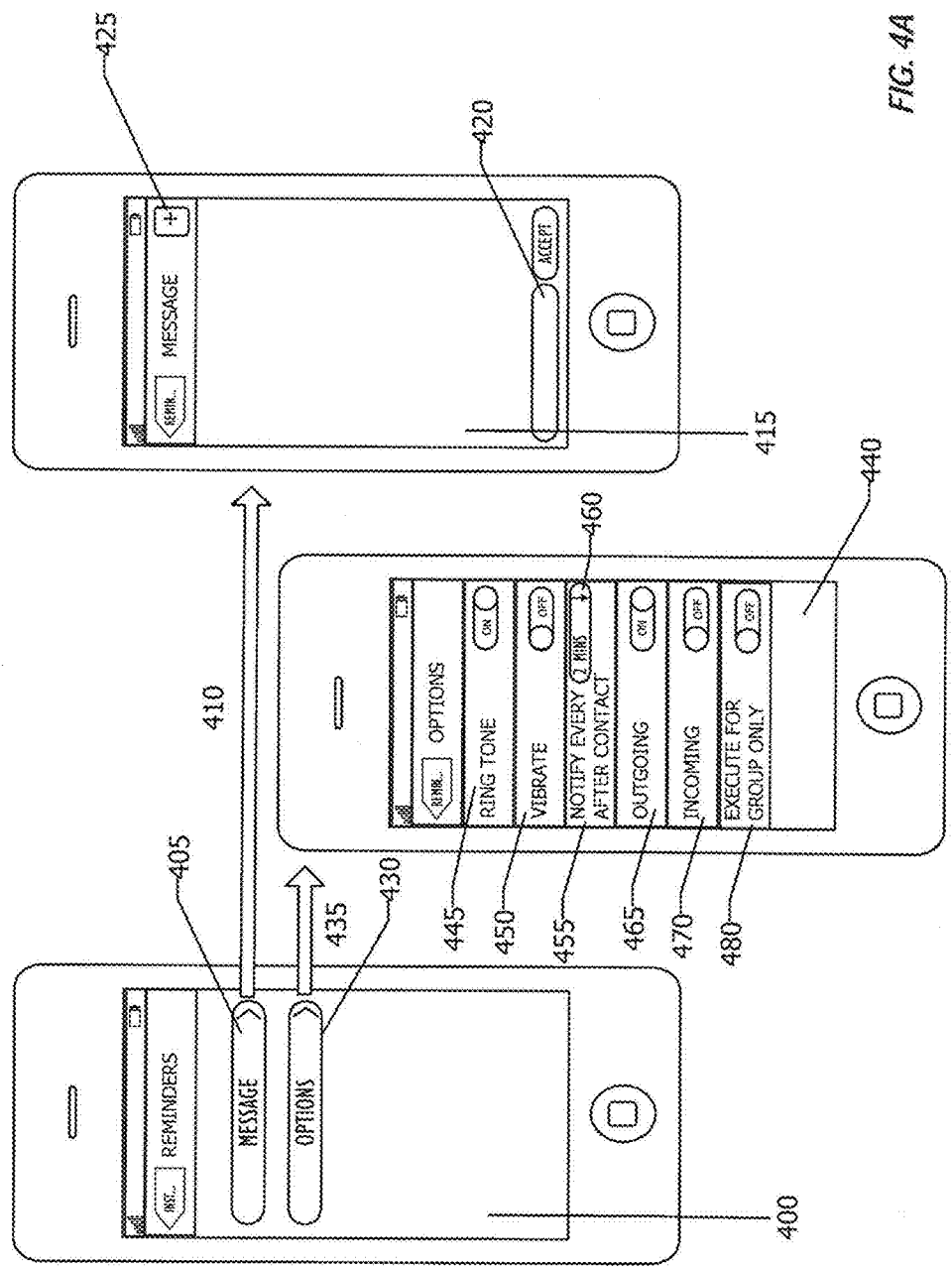
FIGS. 4A-4D show a plurality of screens that may be displayed to create and receive a user reminder, in accordance with an embodiment.

FIGS. 3, 4A, and 5A, by way of non-limiting examples, illustrate a plurality of screens that can be accessed by a user to input one or more executable instructions in accordance with the embodiments described herein. The screen features can be activated via buttons, which may include touch buttons, sliders, switches, control pads, keys, knobs, scroll wheels, keyboards, mice, touchpads, etc., or some combination thereof. In one embodiment, the buttons may allow a user to navigate a graphical user interface (GUI) display. Further, in certain embodiments, the buttons may include a touch screen mechanism. In such embodiments, a user may select or interact with displayed interface elements by simply touching those elements.

Referring to FIG. 3, by way of example only, a user can create an executable instruction through its stored contacts 300 on a device 600. It's understood that the contacts list 300 can include any of the user's contacts lists, including but not limited to telephone contacts, text messaging contacts, email contacts, instant messaging contacts, social networking contacts, etc. Furthermore, contacts may include a group, such as but not limited to co-workers, favorites, etc. It's also understood that the device can be any type, including but not limited to workstation and desktop computer systems, mobile phones, personal music players, tablet computer systems, or other similar electronic devices.

To begin creating an instruction, the user can select any contact (e.g., Jane A) or group from the contact list 300 (310). Selecting a contact opens a contact options screen 305. The user can then select an instructions button 315 (325). This opens the instructions interface 320 (325), which can include buttons for creating reminders 330 or data transfers 335. Furthermore, in one embodiment, the instructions interface 320 may include an assign contacts button 350. When selected, this button 350 allows the user to assign additional contacts to the instructions.

In one embodiment, the user may desire to create a reminder instruction. To do so, the user can select the reminders button 330 (340). This action opens up the reminders display 400, illustrated in FIG. 4A. Alternatively, the user may desire to create a data transfer instruction. To set up a future data transfer the user can select the data transfers button 335. This action opens up the data transfers display 500, illustrated in FIG. 5A. Reminders and data transfers are discussed in further detail below.

FIG. 4A, by way of example only, illustrates a plurality of screens for creating a reminder instruction. The user can select the message button 405 to open the messaging screen 415 (410). This screen 415 comprises a text box 420. The user can enter any type of reminder into the text box 410. It's understood that the reminder can comprise any notification type a user desires, including but not limited to any notification relevant to a communication between the user and any third party or group. For example, in certain embodiments the user can input a reminder to discuss a certain topic, ask a particular question, make an affirmative statement, perform a task, attend an event, etc. The reminder can, for example, be input into the text box 420 via keyboard or voice text.

In one embodiment, the messaging screen 415 may further comprise an add messages button 425. By selecting this button 425 the user can add multiple reminder messages to the instruction.

In addition, in yet another embodiment, the reminders display 400 may comprise an options button 430. Selecting this button 430 opens an options menu 440 (435). A person of ordinary skill in the art understands that the options menu 440 can comprise any number of options that facilitate executing the reminder instruction. By way of example only, in the options menu 440 the user can set the reminder instruction to notify the user with a ring tone 445, vibration 450, or both. In one embodiment, the user can select from a number of ring tones in a drop down menu. Furthermore, the user can select the frequency of the notices 455 via a drop down menu 460. For example, in one embodiment the ring tone can be set to go off every 2 minutes. The user may also select whether the reminder instruction is executed in response to an outgoing 465 or incoming 470 communication, or both. In still another embodiment, instead of inputting a message, the user can select from a list of pre-defined default reminders (e.g., phone spouse, send data, etc.).

In yet another embodiment, the user may choose to limit the instruction's execution to a group communication. For example, the user can set the instruction to execute only for a group communication by toggling an on/off switch 480. In doing so, the instruction may only execute if the user communicates with the entire group. But it may not execute if the user only communicates with one member of the group.

Figure 4B:
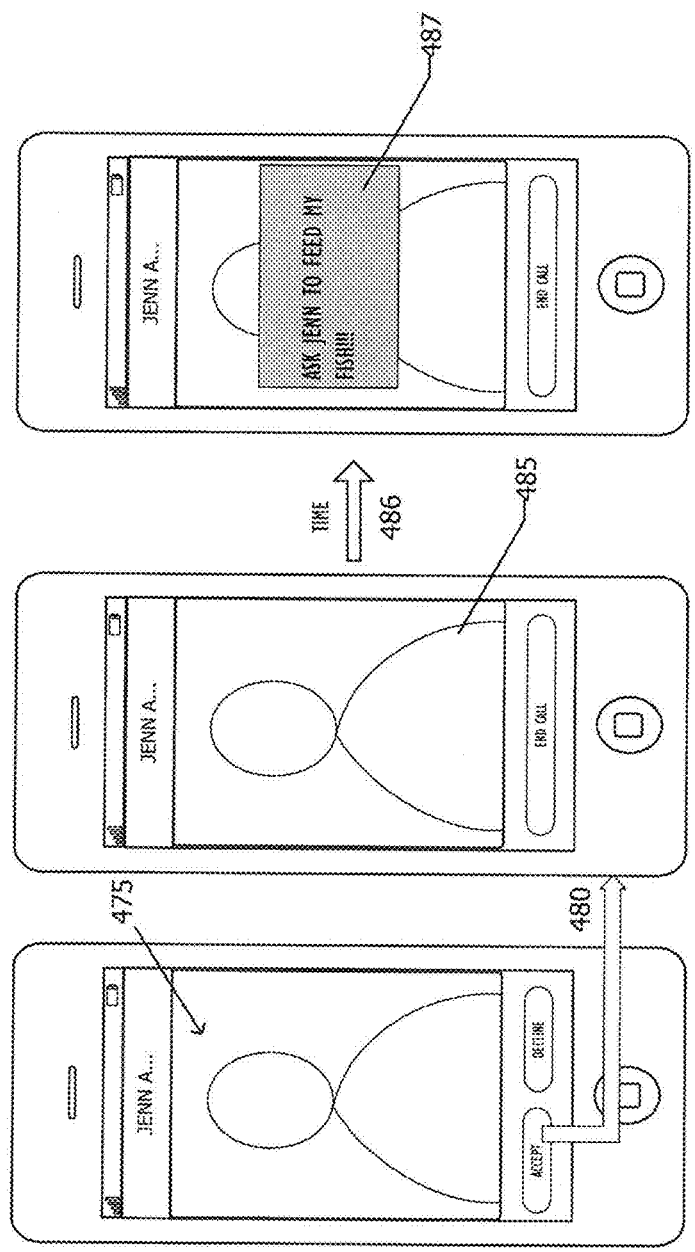

After a user creates the reminder instruction, the device 600 can execute the instruction when the user communicates with the one or more assigned contacts or groups, or vice versa. FIG. 4B, by way of example only, illustrates executing a reminder instruction. In this particular example, the user has previously created a reminder to ask Jenn A to feed the user's fish the next time the user and Jenn A communicate. At no particular time, the user accepts an incoming call 475 from Jenn A (480). After the call is established 485 the system executes the reminder instruction to display to the user the user-defined reminder message 487 (e.g., "Ask Jenn to feed my fish") (486). As explained above, in one embodiment, this reminder message 487 can be accompanied by a notification (e.g., audible tone) at a preset frequency.

Figure 4C:
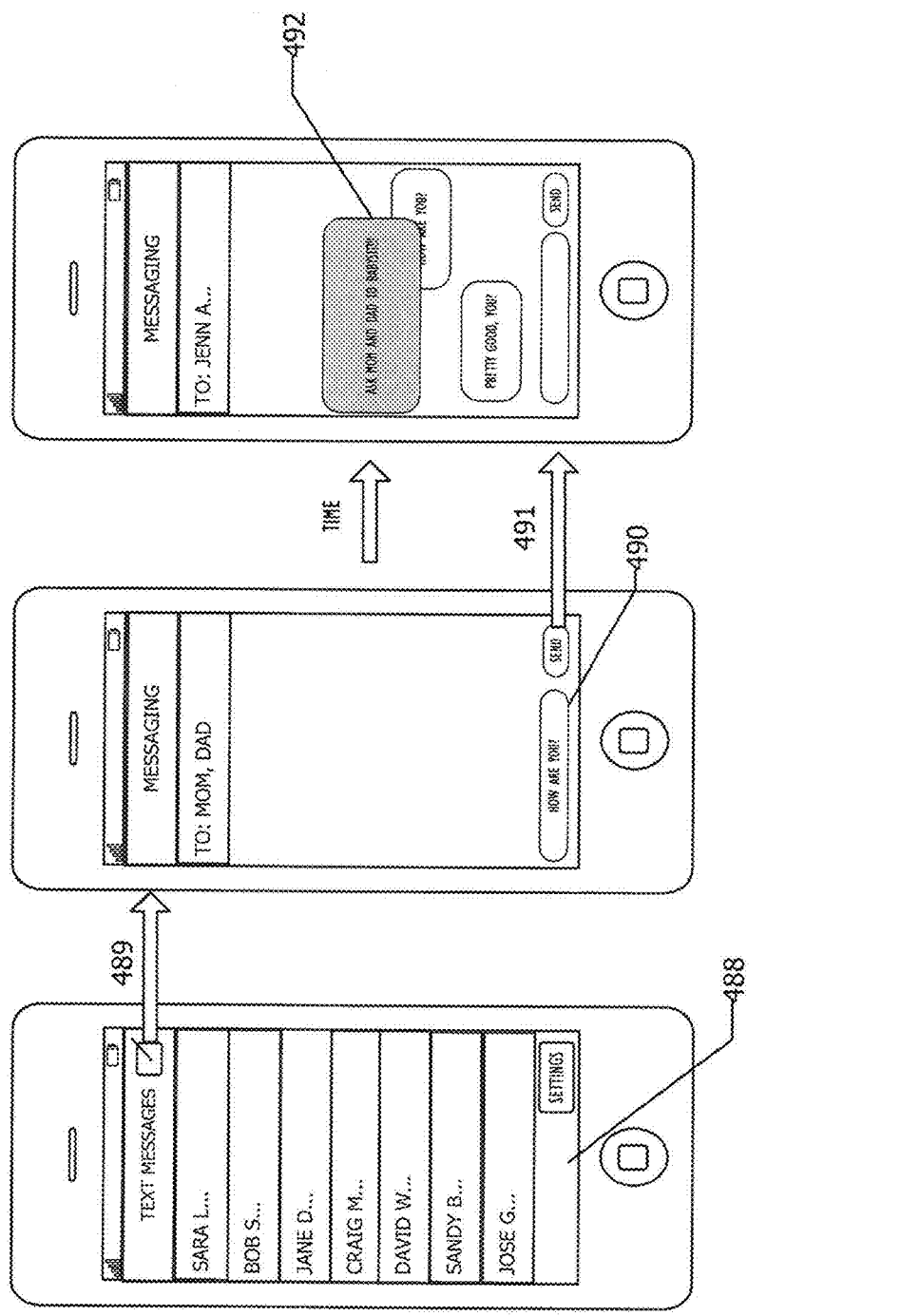

FIG. 4C illustrates yet another example of executing a reminder instruction. In this particular example, the user has previously created a reminder to ask the user's parents to babysit the next time the user and the user's parents communicate. At no particular time, the user accesses a text message interface 488 and creates a new text message 490 to the user's mom and dad (489). After the text message is sent 491 to the user's parents the system executes the reminder instruction to display to the user the reminder message 492 (e.g., "Ask mom and dad to babysit!!!"). As explained above, in one embodiment, the reminder message 492 can be accompanied by a notification (e.g., audible tone) at a preset frequency.

Figure 4D:
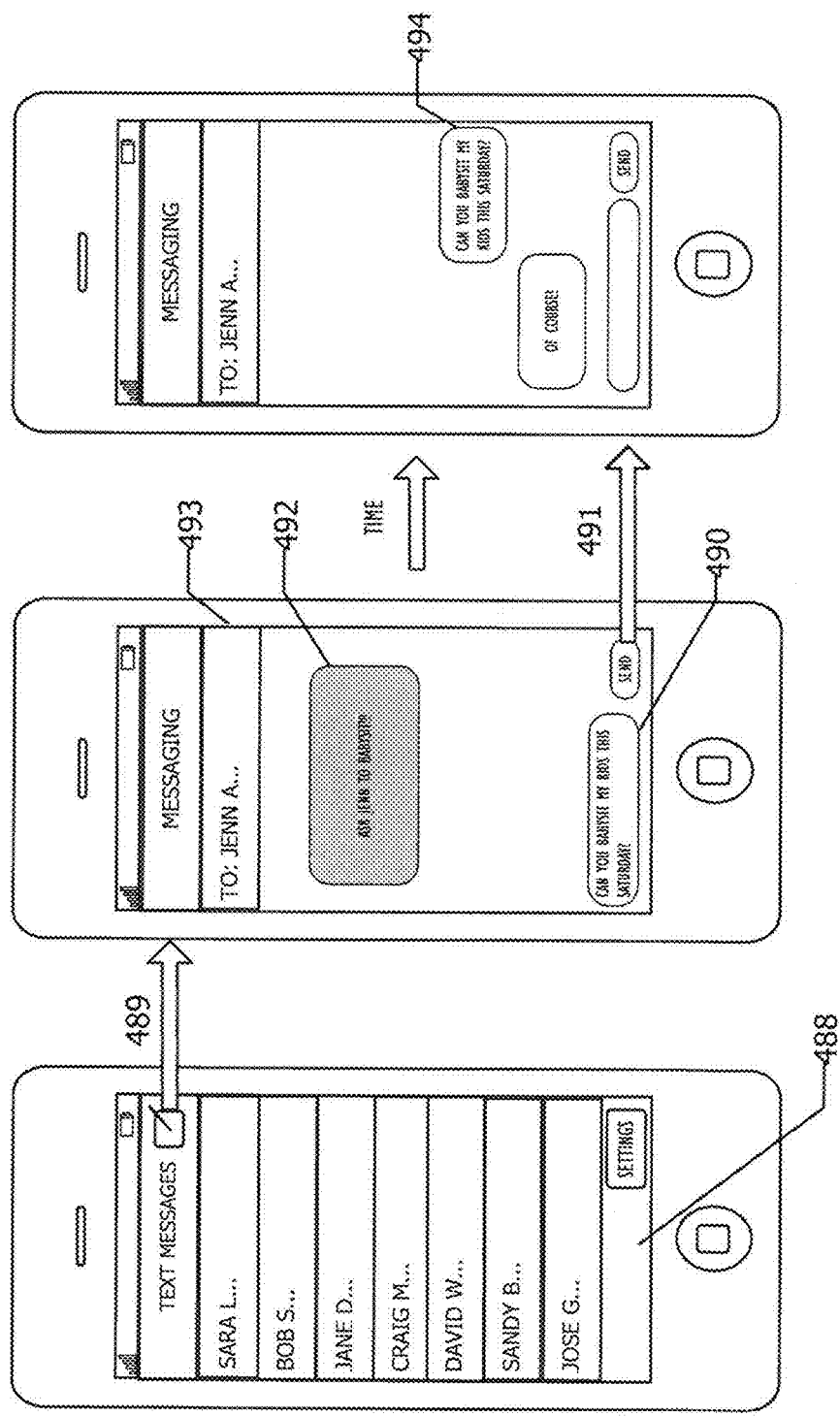

In an alternative embodiment, the system can execute a reminder instruction before the user sends the communication to the contact. For example, referring to FIG. 4D, the user has previously created a reminder to ask Jenn A to babysit the next time the user and Jenn A communicate. At no particular time, the user accesses a text message interface 488 to create a new text message 490 to Jenn A (489). When the user populates the "to:" field with Jenn A's contact information 493 the system executes the reminder instruction to display to the user the reminder message 492 (e.g, "Ask Jenn to babysit!!!"). In another embodiment, the system may execute the reminder instruction as the user presses the "Send" button but before the message is actually sent. At that time, the reminder may be displayed in such a manner as to allow the user to edit their initial message to include a request that Jenn A babysit or, if they had already done this, dismiss the reminder to let the message be sent. In this way, the user is immediately reminded to make the babysitting request with the first outgoing communication 494. In yet another embodiment, executed reminders may be logged so that they may be reviewed at a later time.

FIG. 5A, by way of example only, illustrates a plurality of screens for creating a data transfer instruction. The user can select the choose data button 505 to open the choose data screen 515 (510). This screen 515 can comprise a number of links 520. A user can select a link 520 to pull data from the link's source. It's understood that a user can access the data from any source on the device 600, including but not limited to a photo gallery, video gallery, documents file, social media, cloud, music player, etc. Furthermore, it's understood that data can comprise any type of transferable data, including but not limited to images, videos, contacts, documents, music files, etc.

In one embodiment, the choose data screen 515 may further comprise an add data button 525. By selecting this button 525 the user can add multiple data to the data transfer instruction.

In addition, in yet another embodiment, the data transfer display 500 may comprise an auto transfer option. If turned on, the system will automatically transfer data when the user and a third party communicate. If turned off, the system can alert the user that they have identified a data transfer for a contact and ask them whether they would like to proceed with the transfer or not.

In a further embodiment, the data transfer display 500 may comprise an options button 530. Selecting this button 530 opens an options menu 540 (535). A person of ordinary skill in the art understands that the options menu 540 can comprise any number of options that facilitate executing the data transfer instruction. By way of example only, in the options menu 440 the user can set the data transfer instruction to notify the user of the transfer with a ring tone 545, vibration 550, or both. In one embodiment, the user can select from a number of ring tones in a drop down menu. Furthermore, the user can select the frequency of the notices 555 via a drop down menu 560. For example, in one embodiment the ring tone confirmation can be set to go off every 2 minutes. In another embodiment, the user can select whether the data transfer instruction is executed in response to an outgoing 565 or incoming 570 communication, or both. Finally, in yet another embodiment, the user can select the communication channel 575 for transferring the data 580.

In yet another embodiment, the user may choose to limit the instruction's execution to a group communication. For example, the user can set the instruction to execute only for a group communication by toggling an on/off switch 585. In doing so, the instruction may only execute if the user communicates with the entire group. But it may not execute if the user only communicates with one member of the group.

In yet another embodiment, the data transfer display 500 may comprise a choose recipients button 501. Selecting this button 501 opens the contacts display 300. The user may then select one or more contacts or groups of contacts as recipients of the data transfer. Thus, when the system executes the data transfer the device transfers the data to each of the one or more assigned recipients or groups.

Figure 5B:
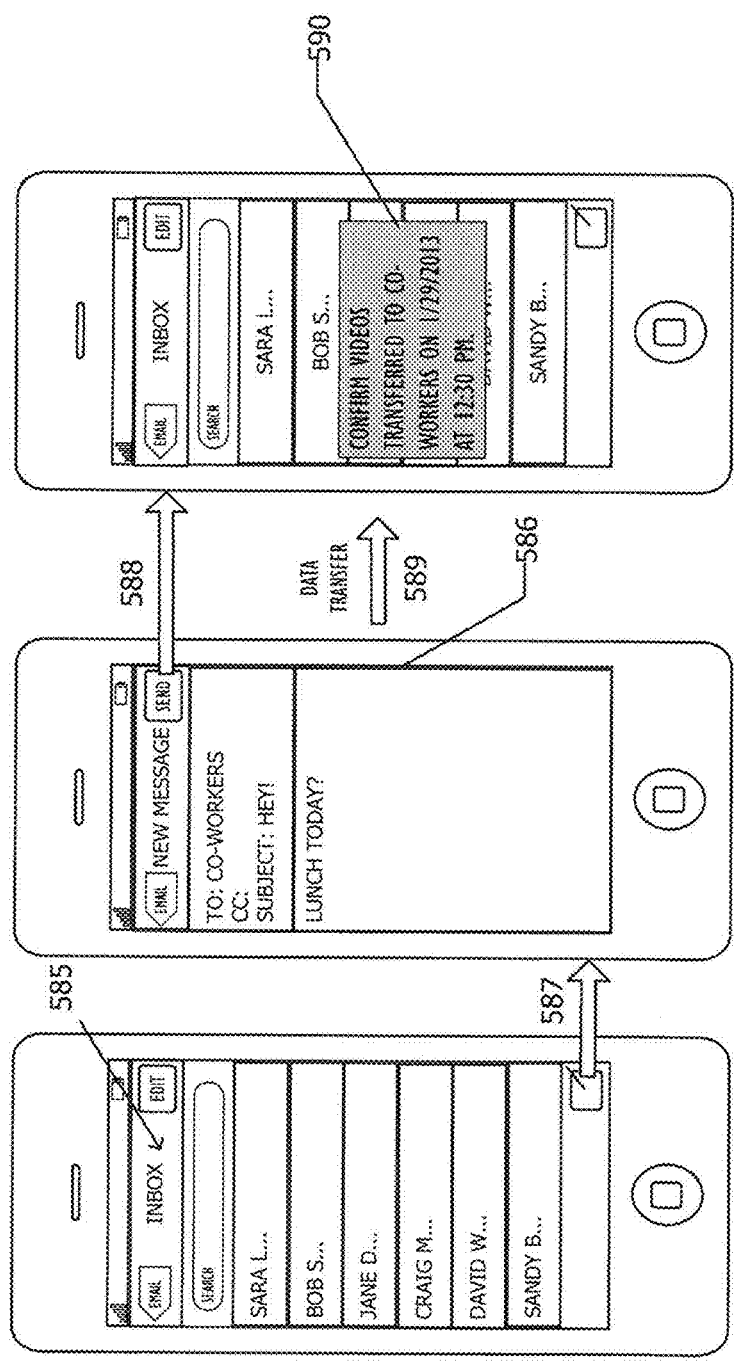

After a user creates the data transfer instruction, the device 600 can execute the instruction when the user communicates with the one or more assigned contacts or groups, or vice versa. FIG. 5B, by way of example only, illustrates executing a data transfer instruction. In this particular example, the user has previously created an instruction to automatically transfer a video to the user's co-workers the next time the user and the user's co-workers communicate. At no particular time, the user accesses an email interface 585 and creates a new email message 586 to the user's co-workers (587). After the email is sent 588 to the user's co-workers the system automatically transfers the video from the user's device to the user's co-workers (589). Finally, the system displays to the user a data transfer confirmation 590. In one embodiment, this confirmation 590 may include the transfer time and date. As explained above, in one embodiment, the confirmation can be accompanied by a notification (e.g., audible tone) at a preset frequency. In yet another embodiment, confirmation messages may be logged so that they may be reviewed at a later time.

Figure 5C:
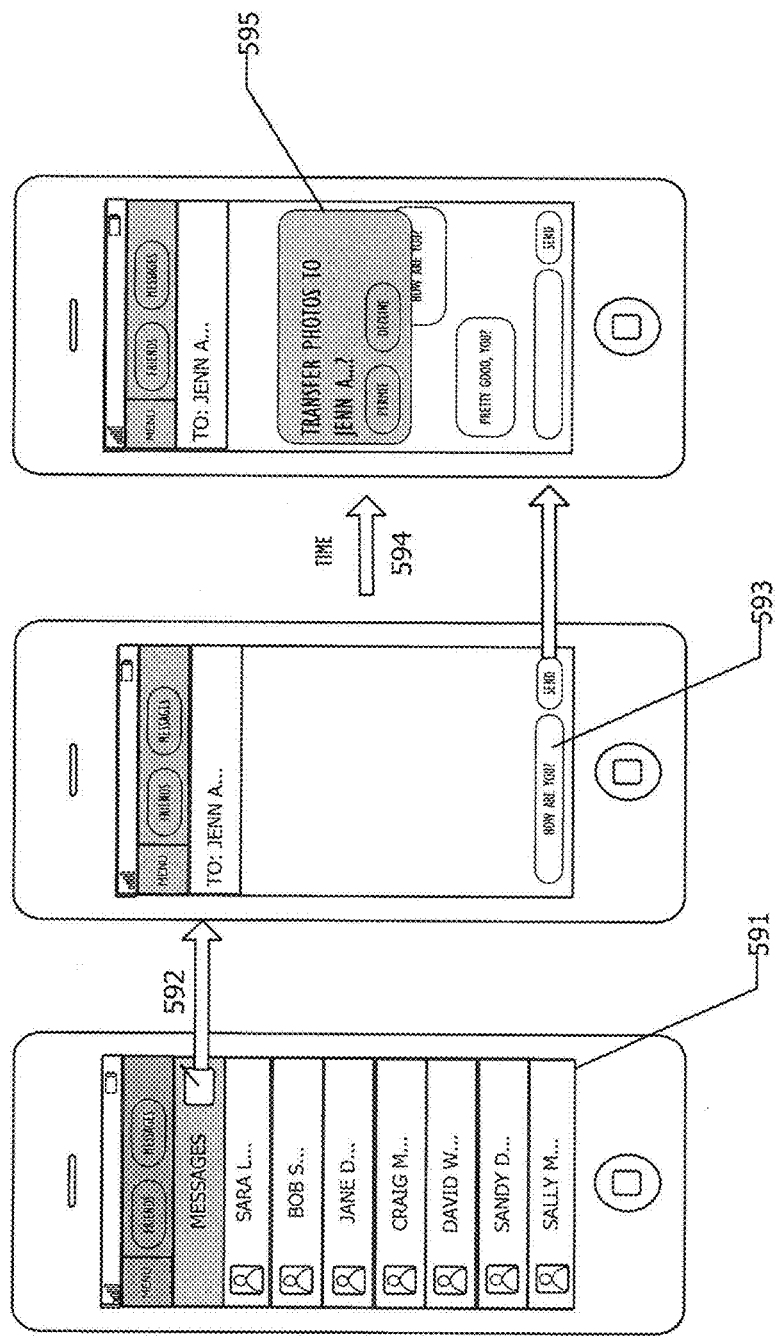

FIG. 5C illustrates yet another example of executing a data transfer instruction. In this particular example, the user has previously created an instruction to transfer a document to Jenn A the next time the user and Jenn A communicate. At no particular time, the user accesses a social networking interface 591 and creates a message 593 to Jenn A (592). After the message is sent 594 to Jenn A the system displays a data transfer request 595. The user can either permit or decline the data transfer. As explained above, in one embodiment, the request can be accompanied by a notification (e.g., audible tone) at a preset frequency. Furthermore, in an alternative embodiment, if the user accepts the data transfer the system displays to the user a data transfer confirmation.

Figure 5D:
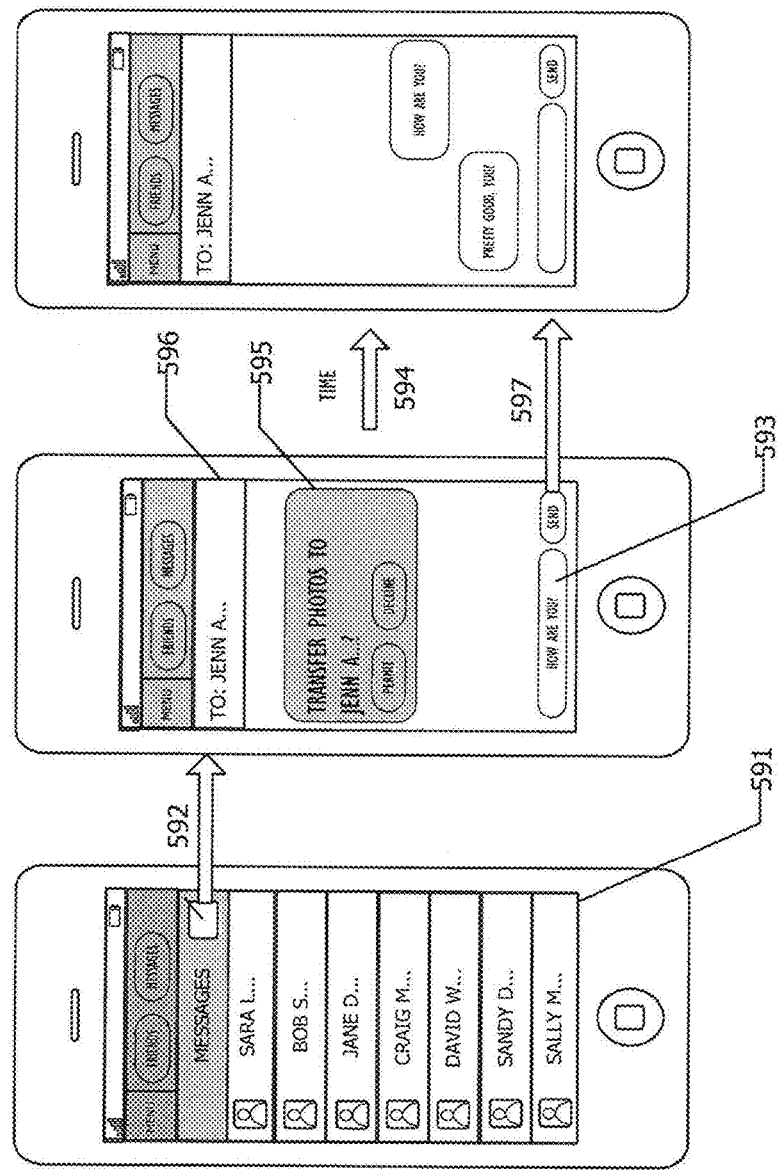

In an alternative embodiment, the system can execute a data transfer instruction before the user sends the communication to the one or more contacts or groups. For example, referring to FIG. 5D, the user has previously created an instruction to transfer a document the next time the user and Jenn A communicate. At no particular time, the user accesses a social networking interface 591 to create a message 593 to Jenn A (592). When the user populates the "to:" field 596 with Jenn A's contact information the system displays a data transfer request 595. The user can either permit or decline the data transfer. In this way, the user is immediately prompted to transfer the data before the first outgoing communication 593. In yet another embodiment, the system can make this determination at the time the user asserts the "SEND" button (597) in a manner similar to that discussed above with respect to sending a text message.

Figure 6:
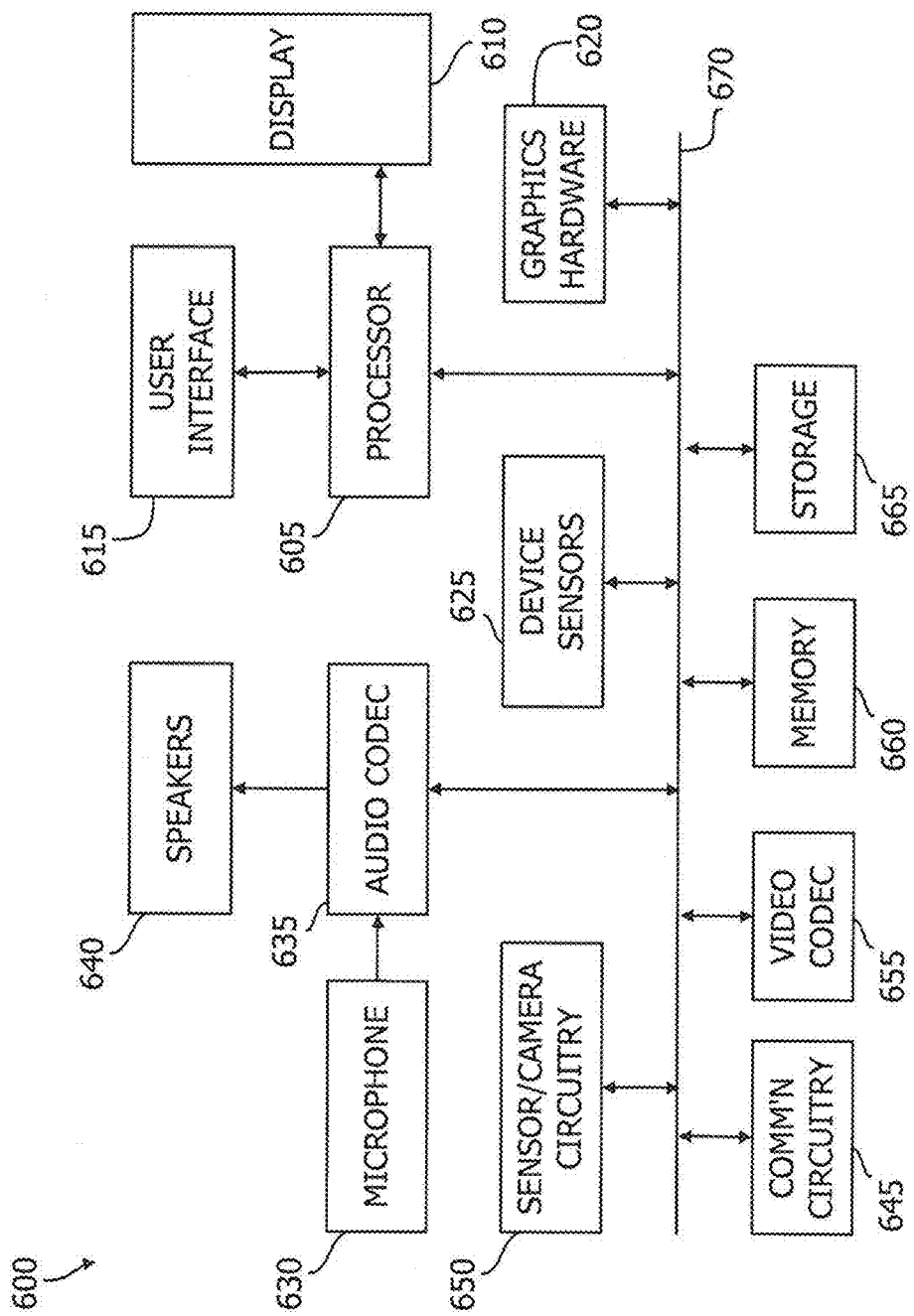
FIG. 6 shows a model electronic device, in accordance with an embodiment.

FIG. 6, by way of non-limiting example, illustrates one embodiment of the electronic device 600. The electronic device 600 may include a processor 605, display 610, user interface 615, graphics hardware 620, device sensors 625 (e.g., proximity sensor/ambient light sensor, accelerometer and/or gyroscope), microphone 630, audio codec(s) 635, speaker(s) 640, communications circuitry 645, digital image capture unit 650, video codec(s) 655, memory 660, storage 665, and communications bus 670. The electronic device 600 may be, for example, a personal digital assistant (PDA), personal music player, mobile telephone, notebook, laptop, tablet computer, or any other similar device. Furthermore, the above described instruction execution engine 200 may be executed on a device that takes the form of device 600.

The processor 605 may execute instructions necessary to carry out or control the operation of many functions performed by device 600. The processor 605 may, for instance, drive display 610 and receive user input from user interface 615. User interface 615 can take a variety of forms, such as a button, keypad, dial, a click wheel, keyboard, display screen and/or a touch screen. Processor 605 may also, for example, be a system-on-chip such as those found in mobile devices and include a dedicated graphics processing unit (GPU). Processor 605 may be based on reduced instruction set computer (RISC) or complex instruction-set computer (CISC) architectures or any other suitable architecture, and may include one or more processing cores. Graphics hardware 620 may be special purpose computational hardware for processing graphics and/or assisting processor 605 to process graphics information. In one embodiment, graphics hardware 620 may include a programmable graphics processing unit (GPU).

Sensor and camera circuitry 650 may capture still and video images that may be processed, at least in part, by video codec(s) 655 and/or processor 605 and/or graphics hardware 620, and/or a dedicated image processing unit incorporated within circuitry 650. Images so captured may be stored in memory 660 and/or storage 665. Memory 660 may include one or more different types of media used by processor 605 and graphics hardware 620 to perform device functions. For example, memory 660 may include memory cache, read-only memory (ROM), and/or random access memory (RAM). Storage 665 may store media (e.g., audio, image and video files), computer program instructions or software, preference information, device profile information, and any other suitable data. Storage 665 may include one or more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 660 and storage 665 may be used to tangibly retain computer program instructions or code organized into one or more modules and written in any desired computer programming language. When executed by processor 605 the computer program code may implement one or more of the methods described herein.

It's understood that the above description is intended to be illustrative, and not restrictive. The material has been presented to enable any person skilled in the art to make and use the inventive concepts described herein, and is provided in the context of particular embodiments, variations of which will be readily apparent to those skilled in the art (e.g., some of the disclosed embodiments may be used in combination with each other). Many other embodiments will be apparent to those of skill in the art upon reviewing the above description. The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

What is claimed is:

1. A computer program embodied on at least one non-transitory computer-readable medium of a first device, the computer program comprising instructions executable to cause at least one processor to:
   detect receipt of a communication at a first device from one or more contacts over a communication path;
   automatically execute a first program instruction to send the communication to one or more third parties associated with the one or more contacts over the communication path based on the detection;
   determine, in response to the detection, a second program instruction is assigned to at least one of the one or more contacts;

automatically execute the second program instruction based, at least in part, on the determination;
automatically perform a user-specified action in response to the execution of the second program instruction, wherein the user-specified action is assigned to at least one of the one or more contacts and comprises providing a reminder; and
transfer data to at least one of the one or more contacts over the communication path, the transferred data having been selected using the first device and created prior to the detected communication.

2. The computer program of claim 1, further comprising instructions to cause the at least one processor to obtain the second program instruction from a user interface executing on the first device, the transferred data having further been stored remotely from the first device and transferred responsive to a selective input at the first device.

3. The computer program of claim 2 wherein the instructions to cause at least one processor to determine comprise instructions to cause the at least one processor to determine an executable second program instruction is assigned to each of the one or more contacts.

4. The computer program of claim 1, the transferred data having further been derived from one or more of the following sources: a photo gallery, a video gallery, document files, social networking site, music player, and cloud.

5. A method for executing instructions on a first device, the method comprising:
detecting, at a first device, by one or more processors, receipt of a communication from one or more contacts of the first device, over a communication path;
automatically executing, by the one or more processors, a first program instruction to send the communication to one or more third parties associated with the one or more contacts over the communication path based on the detection;
determining, by the one or more processors and in response to the detection, a second program instruction is assigned to at least one of the one or more contacts;
automatically executing, by the one or more processors, the second program instruction based, at least in part, on the determination; and
automatically performing a user-specified action in response to the execution of the second program instruction, wherein the user-specified action is assigned to the at least one of the one or more contacts and comprises providing a reminder actuable to cause data to be transferred to a second device corresponding to at least one of the one or more contacts, the data having been selected using the first device and created prior to the detected communication.

6. A first device comprising:
a display; and
one or more processors operatively connected to the display, the one or more processors configured to:
detect a communication from a first device to one or more contacts over a communication path;
automatically execute a first program instruction to send the communication to one or more third parties associated with the one or more contacts over the communication path, based on the detection;
determine, in response to the detection, a second program instruction is assigned to at least one of the one or more contacts;
automatically execute the second program instruction based, at least in part, on the determination;
automatically perform a user-specified action in response to the execution of the second program, wherein the user-specified action is assigned to at least one of the one or more contacts and comprises displaying a reminder relating thereto; and
transfer data to at least one of the one or more contacts, the data having been selected using the first device and created prior to the detected communication.

7. A computer program embodied on at least one non-transitory computer-readable medium, the computer program comprising instructions to cause at least one processor to:
detect, at a first device, receipt of a communication from one or more third parties over a communication path, the one or more third parties associated with one or more contacts;
automatically execute, responsive to the detection, a first program instruction to receive the communication from the one or more third parties;
determine, in response to the detection, a second program instruction is assigned to the one or more contacts;
automatically execute the second program instruction based, at least in part, on the determination; and
automatically perform a user-specified action in response to the execution of the second program instruction, wherein the user-specified action is assigned to at least one of the one or more contacts and comprises displaying a reminder, the reminder actuable at an interface of the first device to cause data to be transferred to a second device corresponding to at least one of the one or more contacts, the data to be transferred having been selected at the first device and created prior to receipt of the communication.

8. The computer program of claim 7, further comprising instructions to obtain the second program instruction from a user interface of the first device, the data to be transferred having further been stored remotely from the first device and the second device and accepted responsive to a selective input at the second device.

9. The computer program of claim 7, wherein the instructions to cause at least one processor to determine comprise instructions to cause the at least one processor to determine an executable second program instruction is assigned to at least one of the one or more third parties.

10. The computer program of claim 7, the data to be transferred having further been derived from one or more of the following sources: a photo gallery, a video gallery, document files, social networking site, music player, and cloud.

11. A method for executing instructions on a device, the method comprising:
receiving, at a first device, a message to the first device from one or more third parties over a communication path, the one or more third parties associated with one or more contacts;
determining, in response to the receipt of the message, a program instruction assigned to at least one of the one or more contacts;
automatically executing the program instruction based, at least in part, on the determination;
providing, using an interface of the first device, a reminder based, at least in part, on the determination; and
automatically performing a user-specified action in response to the execution of the program instruction, wherein the user-specified action is assigned to the one or more contacts and causes a data transfer to at least one of the one or more third parties, the data of the transfer having been selected at the first device and created prior to the message.

12. The method of claim 5, wherein providing a reminder comprises displaying a reminder on a display of the first device.

13. The method of claim 12, wherein the displayed reminder is displayed repeatedly at a predefined frequency.

14. The method of claim 12, wherein the displayed reminder is accompanied by an audible tone.

15. The method of claim 12, wherein the displayed reminder is a pre-defined default reminder.

16. The device of claim 6, wherein the user-specified action is assigned to the one or more contacts through an instant messaging channel.

17. The device of claim 6, wherein the user-specified action is created and assigned to the one or more contacts using a text messaging contacts interface of the first device.

18. The device of claim 6, wherein the communication path comprises at least one of a telephone communication channel, a text message channel, an email channel, or an instant messaging channel.

* * * * *

UNITED STATES PATENT AND TRADEMARK OFFICE
CERTIFICATE OF CORRECTION

Page 1 of 1

PATENT NO. : 10,154,131 B2
APPLICATION NO. : 13/770429
DATED : December 11, 2018
INVENTOR(S) : Gencer Cili et al.

It is certified that error appears in the above-identified patent and that said Letters Patent is hereby corrected as shown below:

In the Claims

Claim number 8, at Column 12, Line number 35, should read -- instructions to cause the at least one processor to obtain the second program instruction from a --

Signed and Sealed this
Fifteenth Day of January, 2019

Andrei Iancu
*Director of the United States Patent and Trademark Office*